United States Patent [19]

Stockdale et al.

[11] 4,021,219
[45] May 3, 1977

[54] METHOD OF MAKING A COMPOSITE GLASS STRUCTURE

[75] Inventors: George Fairbank Stockdale, Princeton; John Leslie Cooper, Hightstown, both of N.J.

[73] Assignee: RCA Corporation, New York, N.Y.

[22] Filed: July 12, 1976

[21] Appl. No.: 704,324

[52] U.S. Cl. .................................. 65/43; 65/36; 65/58; 264/58

[51] Int. Cl.² ..................................... C03C 27/00

[58] Field of Search ............... 65/36, 42, 43, 58; 264/58

[56] References Cited

UNITED STATES PATENTS

| | | | |
|---|---|---|---|
| 2,889,952 | 6/1959 | Claypoole | 65/43 X |
| 3,272,686 | 9/1966 | Smith et al. | 161/68 |
| 3,940,301 | 2/1976 | Straw et al. | 65/36 X |
| 3,983,622 | 10/1976 | Schneider et al. | 65/43 X |

*Primary Examiner*—Arthur D. Kellogg

*Attorney, Agent, or Firm*—Glenn H. Bruestle; Carl L. Silverman

[57] ABSTRACT

A stacking method is employed to assemble a structure which includes a plurality of substantially identical, uniformly spaced parallel glass plates. The method includes the use of a fixture having a slotted surface in which rigid cylindrical spacers can be slidably disposed. Each glass plate is placed with its edge surface on the slotted surface and spaced from the adjacent plates by at least two of the cylindrical spacers, each of the spacers being disposed in a separate slot. Reference planes which are perpendicular to the surface of the fixture are provided so as to maintain the plates in the desired spatial relation. Then, a glass base is bonded onto the opposing edge surface of each of the spaced glass plates. The glass plates and glass base are preferably chosen to be of the same material. The spacers are chosen to be of a material having an expansion coefficient slightly greater than that of the glass plates and glass base.

14 Claims, 7 Drawing Figures

METHOD OF MAKING A COMPOSITE GLASS STRUCTURE

BACKGROUND OF THE INVENTION

This invention relates to a method of making a glass structure, and particularly to such a method in which cylindrical spacers are utilized to assemble a structure which includes a plurality of uniformly spaced glass plates.

Display devices have been proposed which include a plurality of spaced parallel glass plates which are disposed between a back surface and a front viewing surface. The back surface includes a cathode area and the front surface includes a phosphor viewing screen. The glass plates are maintained in parallel relation through a bond to a common surface. The common surface may be glass surface, e.g., the front or back surface. The spaces between the glass plates may include structures for multiplying and/or modulating electrons emitted from the cathode. However, in any case, it is particularly desirable that the spacing between adjacent plates be substantially uniform since this spacing can be employed to fix at least one dimension of each particular display element, e.g., image line height or image line width. Thus, the element uniformity of the display device is strongly dependent on the spacing between adjacent glass plates.

Display devices of this type would be useful as a relatively large flat image display device. For example, such a device may have viewing dimensions on the order of 30 × 40 inches (75 × 100 cm) with a thickness of about 1 inch (2.5 cm). In such a structure, for good resolution, it may be desirable that each of the glass plates be rectangularly shaped and about 40 × 1 × 0.020 inch (100 × 2.5 × 0.05 cm). In one embodiment, a desirable spacing between adjacent glass plates would be about 60 mils (0.15 cm).

Conventional techniques are not capable of constructing such a glass structure without the use of expensive bulky equipment, i.e., fixtures. In addition, in most of these techniques, additional non-uniformities are introduced into the spacing between the plates due to the use of spacers which are in fixed position. That is, dimensional tolerance in fixture parts results in unacceptable errors in spacing. Also, these techniques often cause sagging during assembly since the use of heat is typical during bonding. Further, these techniques often result in internal stresses within the glass structure which subsequently cause cracking or breaking. These stresses are typically caused by expansion differences in the fixture which occur during heating and cooling. Thus, it would be desirable to develop a simple method of making a glass structure which permits the construction of a plurality of uniformly spaced glass plates.

SUMMARY OF THE INVENTION

A method for assembling a structure which includes a plurality of spaced glass plates. Each of the glass plates has a pair of opposing major surfaces and each has two pairs of opposing edge surfaces. The method includes disposing one of the glass plates on a refractory fixture with an edge surface of the glass plate being on a surface of the fixture. The surface of the fixture is substantially planar and includes at least two slots which extend along the surface. The edge of the glass plate extends transversely over the slots with the glass plate and the fixture being spatially oriented such that at least a component of gravity functions to enhance physical contact between the edge and the surface of the fixture. A reference plane is disposed in substantially orthogonal relation to the surface of the fixture. The reference plane is positioned in fixed relation to the glass plate such that the major surfaces of the glass plate are orthogonal to the surface of the fixture. A second one of the glass plates is disposed substantially the same as the first glass plate. A major surface of the second glass plate is spaced from the other of the major surfaces of the first glass plate by at least a pair of refractory rigid cylindrical spacers. Each of the spacers is axially disposed in parallel relation to the major surfaces of the first and second glass plates with one end of each of the spacers being slidably disposed in a separate slot. The spacers extend out of the slots so as to be in intimate contact with the other of the major surfaces of the first glass plate and the major surface of the second glass plate.

Then, a second reference plane is disposed in substantially orthogonal relation to the surface of the fixture. The second reference plane is positioned in fixed relation to the second glass plate such that the major surfaces of the second glass plate are orthogonal to the surface of the fixture. Then, a surface of a glass base is bonded to the opposing edge surface of each of the glass plates.

DETAILED DESCRIPTION OF THE DRAWINGS

Figure 1:
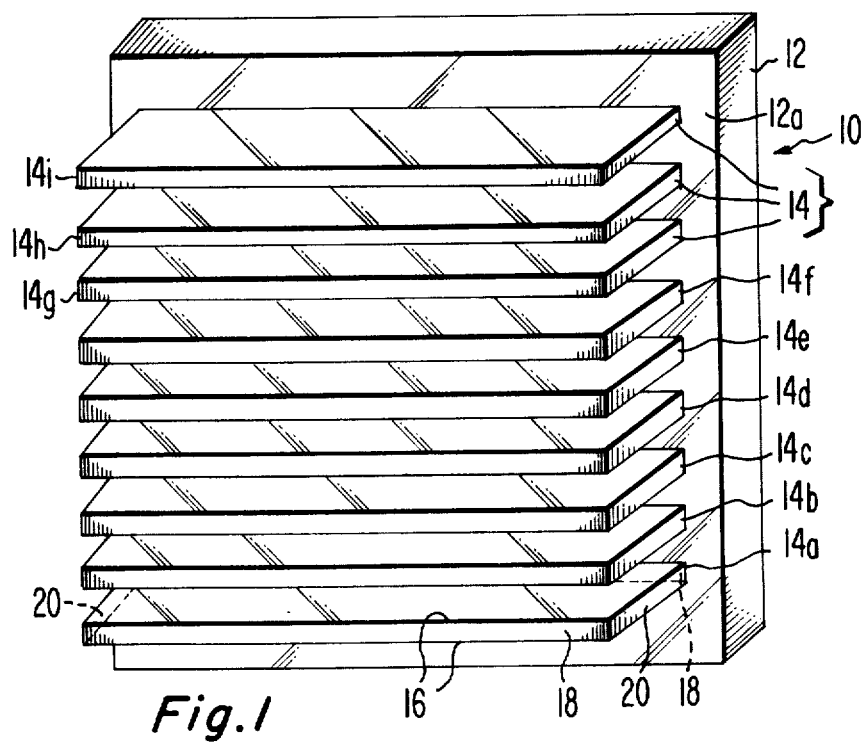
FIG. 1 is a perspective view of one form of structure made through the method of the present invention.

Referring initially to FIG. 1, one form of glass structure made through the method of the present invention is generally designated as 10. The glass structure 10 includes a base 12 of glass having a substantially planar surface 12a. The thickness of the glass base 12 is about 0.020 inch (0.05 cm), although any thickness greater than 0.020 inch will also suffice. A plurality of uniformly spaced, parallel glass plates 14 are bonded to the surface 12a of the glass base 12. Each of the plates 14 is in the form of a rectangular solid having dimensions of about 40 × 1 × 0.020 inch (100 × 2.5 × 0.05 cm). For clarity of description, each glass plate 14 is considered to include the following: a pair of opposing major surfaces 16; a pair of opposing major edge surfaces 18; and a pair of opposing minor edge surfaces 20. The parallel glass plates 14 are oriented with respect to the surface 12a of the glass base 12 such that the major surfaces 16, i.e., larger surfaces, of each rectangular plate 14 are in orthogonal relation to the surface 12a of the glass base 12. Both the glass plates 14 and the glass base 12 are of the same material, e.g., soda-lime-silicate glass.

Figure 2:
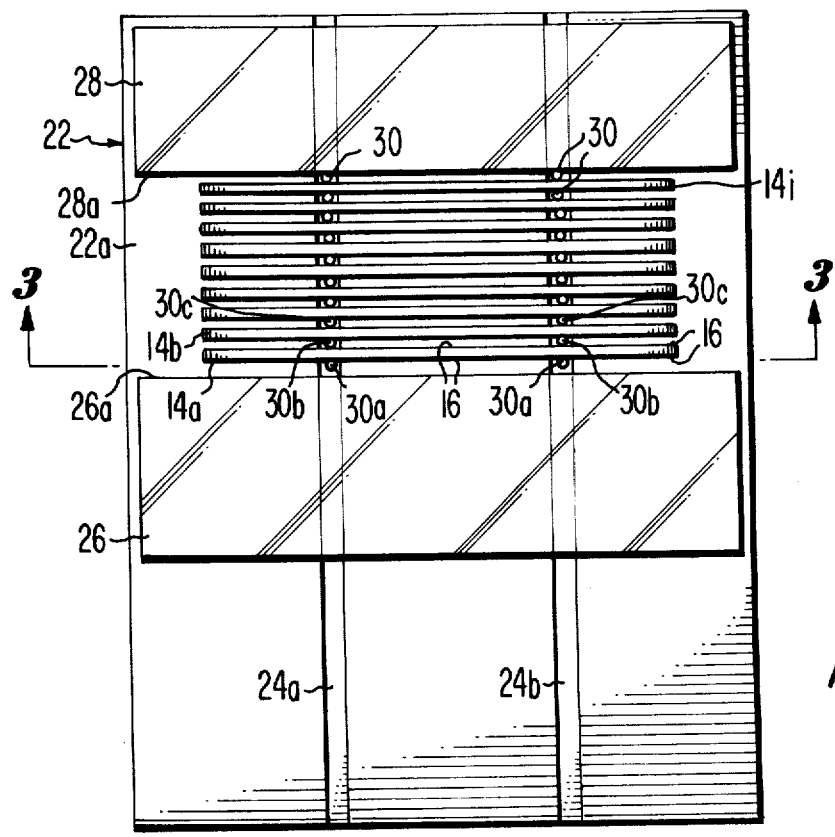
FIG. 2 is a plan view showing one form of an apparatus useful in carrying out the method of the present invention.
Figure 3:
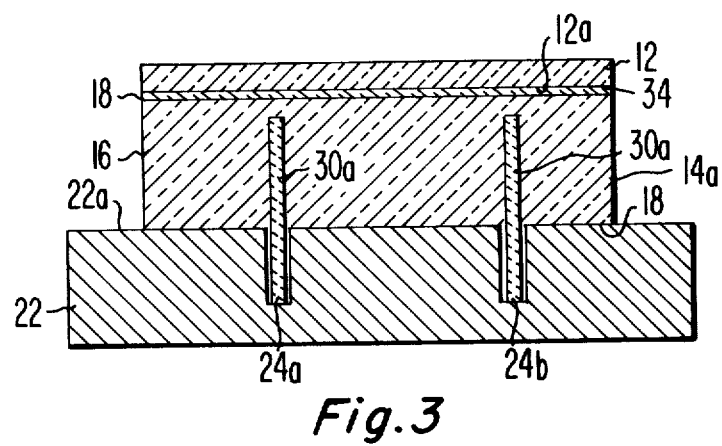
FIG. 3 is a sectional view of the apparatus of FIG. 2 taken along line 3—3.

In the assembly of the structure 10 of FIG. 1, it is necessary to employ a fixture 22, such as the one shown in FIGS. 2 and 3. The fixture 22 may be of any rigid refractory material, e.g., stainless steel or glass. By refractory it is meant a high temperature resistant material. The fixture includes a top surface 22a which is substantially planar. The fixture 22 includes at least two slots 24a and 24b in the surface 22a which extend along the surface 22a. The slots 24a and 24b may be parallel, as in FIGS. 2 and 3. Typically, a sufficient number of slots are provided so as to correspond to the length of the glass plate utilized. For example, a slot should generally appear every inch or so along the length of the glass plate.

In the assembly of the structure 10 of FIG. 1, it is also necessary to employ two reference planes. The reference planes can be provided by the use of sliding blocks 26 and 28, as shown in FIG. 2. The sliding blocks 26 and 28 are each of a shape such that, when placed on the surface 22a of the fixture 22, the blocks 26 and 28 respectively have edge surfaces 26a and 28a which constitute the reference planes. These edge surfaces 26a and 28a, i.e., reference planes, are each substantially perpendicular to the top surface 22a of the fixture 22. The sliding blocks 26 and 28 may each be of a rigid refractory material, e.g., glass or stainless steel.

Also essential to the method of the present invention are cylindrical spacers 30 (also designated 30a, 30b and 30c), shown in FIGS. 2 and 3. The cylindrical spacers 30 are of a diameter slightly smaller than the width of the slots 24a and 24b so as to permit the spacers to be slidably located in the slots, as will be discussed. For example, the slots 24a and 24b may have a width of 0.0625 inch $$\begin{pmatrix} +0.002'' \\ -0.000'' \end{pmatrix}$$

for a 0.060 inch spacer $$\begin{pmatrix} 1.5\text{ mm} \begin{array}{c} +.05\text{ mm} \\ -.00\text{ mm} \end{array} \end{pmatrix}$$

for a 0.15 cm spacer. The spacers 30 are made of a rigid refractory material, such as a ceramic. The spacers 30 should be of a material having a coefficient of expansion at least equal to that of the glass being bonded. It is preferred that its expansion coefficient be slightly greater than the glass being bonded. For example, since soda-lime-silicate glass has an expansion coefficient of about $90 \times 10^{-7}/C°$, a preferable spacer should have an expansion coefficient of at least $90 \times 10^{-7}/C°$, or slightly higher. A preferred spacer material is forsterite ($Mg_2SiO_4$), especially centerless ground forsterite, commercially available from 3M Company under the designation Alsimage 243. It should be noted that forsterite has an expansion coefficient of about 100 to $112 \times 10^{-7}/C°$.

To carry out the method of the present invention, the fixture 22 is typically disposed with its top surface 22a horizontal or nearly horizontal. The sliding block 26 is placed on the top surface 22a such that its edge surface 26a (reference plane) is substantially orthogonal to the top surface 22a, as shown in FIG. 2. Then, a pair of substantially identical rigid cylindrical spacers 30a are placed separately in each slot 24a and 24b. The spacers 30a are substantially identical in the sense that they are of the same diameter, although they need not be of the same length. Each of th spacers 30a is disposed with one end slidably located in the respective slot and extends out of the slot so as to be in intimate contact with the edge surface 26a of the sliding block 26.

Next, one of the rectangular glass plates 14a is placed with one of its major edges 18 on the top surface 22a of the fixture 22, as shown in FIG. 3. Due to the spatial orientation of the glass plate 14a and the fixture 22, at least a component of gravity functions to enhance physical contact between the major edge 18 and the top surface 22a. The glass plate 14a is placed so that one of its major surfaces 16 is in intimate contact with each of the rigid spacers 30a. In this manner, the reference plane 26a can be considered to be in fixed relation to the glass plate 14a. This means that the major surfaces 16 of the first glass plate 14a and the cylindrical spacers 30a are orthogonal to the surface 22a of the fixture 22. It is preferable to slightly incline the surface 22a of the fixture 22 with respect to a horizontal plane so that the weight of the glass plate 14a and the spacers 30a enhances the intimate contact therebetween.

Next, a second pair of substantially the same spacers 30b are similarly placed in the respective slots in intimate contact with the other major surface 16 of the glass plate 14a, as shown in FIG. 2. Then, the second glass plate 14b is similarly placed on the surface 22a and a third pair of cylindrical spacers 30c are placed in the slots in intimate contact with the other major surface 16 of the glass plate 14b. The sliding block 28 can then be placed on the surface 22a and moved therealong until its edge surface 28a (reference plane) is in intimate contact with the third pair of spacers 30c. As previously stated with regard to the reference plane 26a, the reference plane 28a can be considered to be in fixed relation to the glass plate 14b such that the major surfaces 16 of the glass plate 14b are orthogonal to the surface 22a of the fixture 22. Slight inward pressure on the sliding blocks 26 and 28 against the spaced glass plates will ensure that intimate contact is maintained throughout the structure so as to maintain the desired spatial relation, i.e., uniform spacing between adjacent plates. This sequence can be repeated until the desired number of parallel spaced glass plates are assembled and maintained in the desired spatial relation. For example, glass plates 14a through 14i are shown in FIG. 2.

Then, the parallel plates can be bonded to the surface of a glass base so as to form the glass structure of FIG. 1. For example, as shown in FIG. 3, the opposing major edge surfaces 18 of each of the glass plates 14a–14i can be bonded to a surface 12a of a glass base 12 through the use of a frit material 34. This can be accomplished by screen printing or roller coating the opposing major edge surface 18 of each of the glass plates 14a–14i with a suitable frit material.

The glass base 12 is then placed on top of the coated surfaces such that the surface 12a of the glass base plate 12 is in contact with the coated edge surfaces. The entire structure, including the fixture 22, is then heated to a sufficiently elevated temperature such that the frit material melts and flows. During the heating, the sliding blocks 26 and 28 are pressed inward against the spaced glass plates so as to maintain intimate contact therebetween. Holding the structure at the elevated temperature causes the frit to mature, i.e., crystallize. This causes the surface 12a of the glass base 12 to be bonded to each of the glass plates 14a–14i. Then, the spacers are removed so as to result in the structure of FIG. 1.

One suitable frit material includes the following (weight percent): 12.3% BaO; 10.9% $Li_2O$; 2.3% $Al_2O_3$; and 74.6% $B_2O_3$. Typically, this frit is heated to a temperature of about 530° to about 550° C. At this temperature, the frit flows and wets the glass, then crystallizes to a highly crystalline state. The high crystalline content of the fused glass allows the reheating of unsupported glass structures to 550° C without dimensional changes in the sealed joints. Also, this frit contains no readily reducible ions so as to permit its firing to take place under a reducing, inert, or oxidizing atmosphere.

Structures made through the method of the present invention have more uniform spacing between the parallel plates than those made through conventional methods. One reason for this uniformity is that the spacers are extremely uniform. For instance, centerless ground ceramic spacers can be machined to tight tolerances, e.g., 60 mil diameter with tolerances of ±0.0001 inch (0.15 cm ± 2.5 μm). In addition, since the spacers are slidably located in the slots, they float, i.e., they move freely, when exposed to the elevated temperature of the bonding step so as to maintain the desired spacing. The floating nature of the cylindrical spacers minimizes stresses which would otherwise weaken the structure. Also, since the precision cylindrical spacers are rigid at the bonding temperature, they provide the spacing function independent of rotational orientation.

Also, by choosing a glass plate-glass base combination having substantially the same coefficients of expansion and a ceramic spacer having a slightly greater expansion coefficient, proper spacing is maintained before, during, and after bonding. The slightly higher expansion coefficient of the rigid spacers permits the easy removal of the spacers after the plates have been bonded and cooled. Further, by disposing the fixture and parallel glass plates with the force of gravity being exerted across the smallest dimension of each of the glass plates, sagging of the glass plates during the heating step is substantially prevented.

Figure 4:
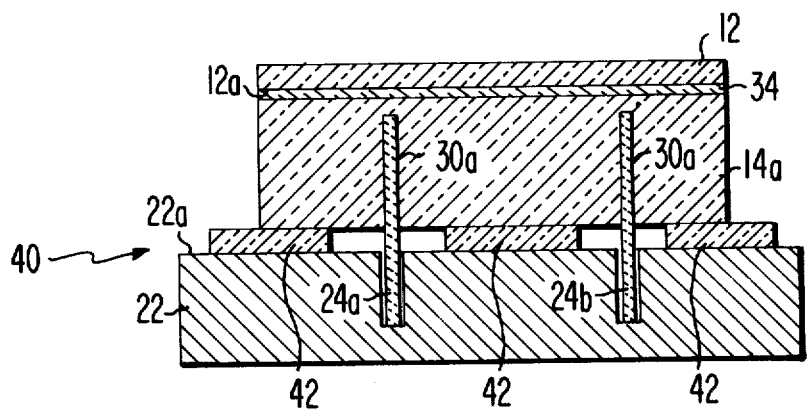
FIG. 4 is a sectional view of the apparatus of FIGS. 2 and 3, slightly modified, and taken as in FIG. 3.

In some instances, it may be desirable to employ the apparatus 40 shown in FIG. 4. The apparatus 40 is the same as the one shown in FIGS. 2 and 3 except it includes glass spacers 42 which form the surface of the fixture which contacts the glass plates. The spacers 42 are substantially planar and disposed on the surface 22a of the fixture 22. Their function is to provide a glass spacing layer to lessen the friction between the glass plates and the surface of the fixture when the fixture is of a material such as stainless steel. When the glass spacers 42 are employed, they are preferably chosen to be of the same material as the glass plates and glass base since the expansion of the glass spacers affects the expansion of the parallel plate structure. Furthermore, although not shown in FIG. 2, the cylindrical spacers which separate the glass plates 14 from the sliding blocks 26 and 28 can be omitted. When this is done, the reference planes themselves can be used to assert the inward pressure which maintains the desired spacing between plates during bonding. That is, the reference planes are in fixed relation to the glass plates in the sense of actual physical contact therewith.

It should also be noted that the method of the present invention permits the assembly of parallel plates having varied uniform spacings. For example, if desired, the spacings between alternate plates could be equal with the spacing between adjacent plates being unequal. This can be simply accomplished through the use of two or more different sets of cylindrical spacers, each set being substantially identical. Or, if the spacing between adjacent plates is desired to be nonuniform, two unequally sized cylindrical spacers can be employed. Additional plates can then be assembled with these same spacers.

Figure 5:
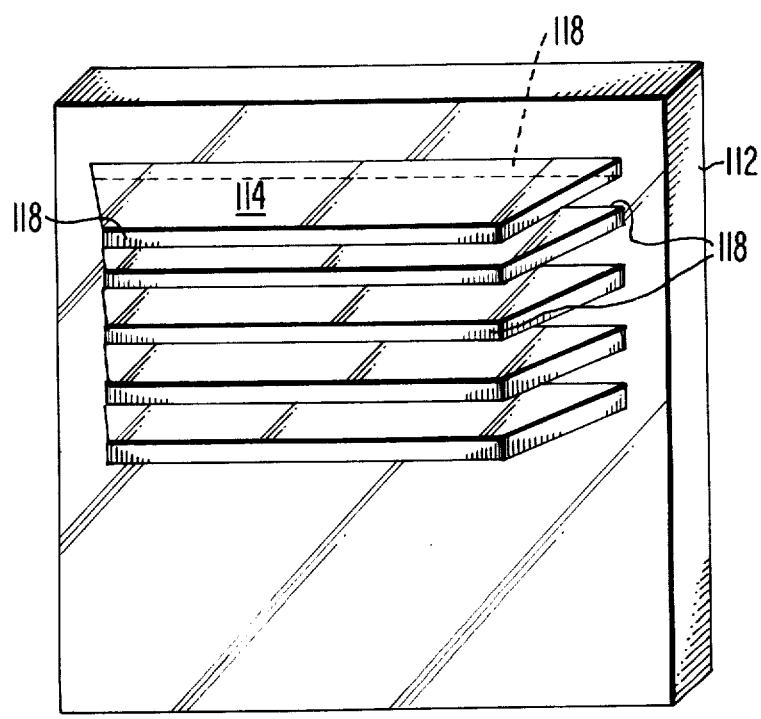
FIGS. 5 and 6 are perspective views of variations of the structure shown in FIG. 1.
Figure 6:
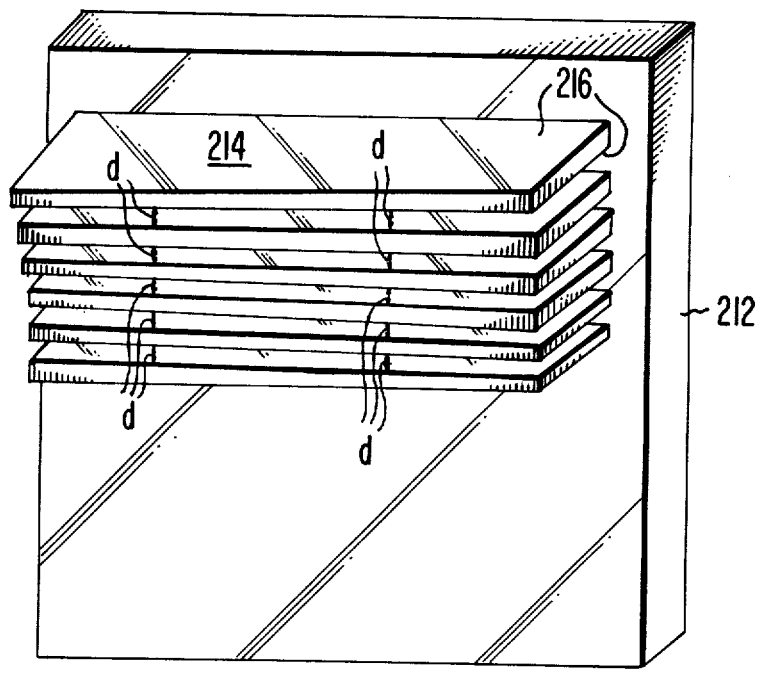

The method of the present invention is useful in the assembly of many glass plate structures, not merely rectangular plates. For instance, it is only necessary that the glass plates include a pair of opposing major surfaces and two pairs of opposing edge surfaces. For example, as shown in FIG. 5, each glass plate 114 may be nonrectangular, but includes a pair of major edge surfaces 118 which are respectively coplanar with the major edge surfaces 118 of the adjacent glass plates 114. Also, if desired, the opposing major surfaces 216 of each glass plate 214 need not be in parallel relation, as shown in FIG. 6. However, the spacing d between adjacent plates 214 will still be uniform if the method of the present invention is employed. This result is significant since inexpensive glasses, e.g., window glass, frequently include major surfaces which are not in parallel relation.

Figure 7:
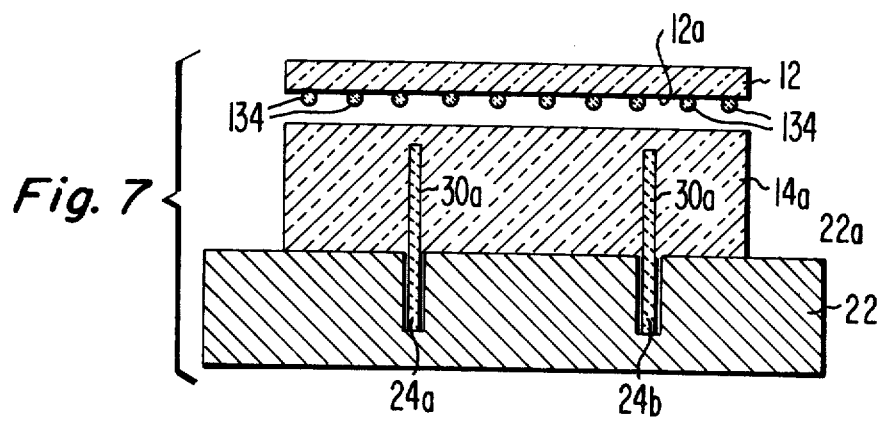
FIG. 7 is an exploded view of the apparatus of FIG. 3 showing a fritting step useful in making the structure of FIG. 1.

In any strutural variation, however, it is necessary that the plates include a pair of opposing edge surfaces which are substantially coplanar with the corresponding pair of edge surfaces of the adjacent glass plate since these surfaces must contact with a pair of planar surfaces, i.e., the fixture surface and the glass base surface. But, the edge surfaces need not be perfectly coplanar since slight variations can be corrected by the presence of the frit material. If the edge surfaces are known, or suspected to be, slightly imperfect it may be desirable to modify the bonding step. That is, instead of coating e.g., screen printing, the edge surfaces of the glass plates, the frit material can be applied to the glass base in the form of ribbons 134, as is known in the art, as shown in FIG. 7. The frit material ribbons should appear frequently, e.g., about every ½ inch, (1 cm), so that even if a ribbon misses the edge surface of one glass plate, adjacent ribbons will provide sufficient bonding to that glass plate so as to produce a rigid, stable structure.

The method of the present invention is useful for many different glass compositions and cylindrical spacer combinations. For example, a borosilicate glass, such as the one commercially available from Corning Glass under the designation 7052, can be used for both the glass plates and the glass base. However, since the borosilicate glass has an expansion coefficient of about $46 \times 10^{-7}/C°$, it is desirable to choose a cylindrical spacer which is compatible with the borosilicate glass. An alumina ($Al_2O_3$) spacer, having an expansion coefficient of about $65 \times 10^{-7}/C°$, is one suitable spacer material.

We claim:

1. A method for assembling a structure which includes a plurality of spaced glass plates, each of said glass plates having a pair of opposing major surfaces and each having two pairs of opposing edge surfaces, which method comprises:

a. disposing one of said glass plates on a refractory fixture with an edge surface of said glass plate on a surface of said fixture, said surface of said fixture being substantially planar and including at least two slots which extend along said surface, said edge of said glass plate extending transversely over said slots, said glass plate and said fixture being spatially oriented such that at least a component of gravity functions to enhance physical contact between said edge and said surface of said fixture;

b. disposing a reference plane in substantially orthogonal relation to said surface of said fixture, said reference plane positioned in fixed relation to said glass plate such that said major surfaces of said glass plate are orthogonal to said surface of said fixture;

c. disposing a second one of said glass plates as in step a) with a major surface of said second glass plate being spaced from the other of said major surfaces of said first glass plate by at least a pair of refractory rigid cylindrical spacers, each of said spacers being axially disposed in parallel relation to the major surfaces of said first and second glass plates with one end of each of said spacers being slidably disposed in a separate slot and extending out of said slots so as to be in intimate contact with the other of said major surfaces of said first glass plate and said major surface of said second glass plate;

d. disposing a second reference plane in substantially orthogonal relation to said surface of said fixture, said second reference plane positioned in fixed relation to said second glass plate such that said major surfaces of said second plate are orthogonal to said surface of said fixture; and e. bonding a surface of a glass base to the opposing edge surface of each of said glass plates.

2. A method in accordance with claim 1 in which step (c) is repeated until the desired number of glass plates are obtained and in which step (d) includes placing said second reference plane in fixed relation to the last glass plate.

3. A method in accordance with claim 2 which includes applying inward pressure to said reference plane during step (e) so as to maintain said intimate contact between said glass plates and said cylindrical spacers.

4. A method in accordance with claim 2 which includes placing at least a pair of said rigid cylindrical spacers between said first reference plane and said first glass plate and placing at least another pair of said refractory rigid cylindrical spacers between the second reference plane and said last glass plate.

5. A method in accordance with claim 2 which includes disposing a glass spacing layer between said edges of said glass plates and said surface of said fixture.

6. A method in accordance with claim 2 in which said rigid cylindrical spacers are substantially identical.

7. A method in accordance with claim 6 in which each of said glass plates includes a pair of major edges and a pair of minor edges with said major edges being in substantially coplanar relation with said major edges of adjacent ones of said glass plates, which includes the step of disposing one of said major edges of each of said plates on said surface of said fixture.

8. A method in accordance with claim 7 which includes slightly inclining said surface of said fixture so that the weight of said cylindrical spacers and said glass plate tends to enhance said intimate contact.

9. A method in accordance with claim 7 in which said cylindrical spacers have a coefficient of expansion which is at least equal to that of said glass plates and said glass base.

10. A method in accordance with claim 9 in which said cylindrical spacers have a coefficient of expansion which is greater than that of said glass plates and said glass base.

11. A method in accordance with claim 9 in which said glass plates comprise soda-lime-silicate glass.

12. A method in accordance with claim 11 in which said glass base comprises soda-line-silicate glass.

13. A method in accordance with claim 9 in which said spacers comprise a ceramic.

14. A method in accordance with claim 13 in which said ceramic comprises forsterite.

* * * * *